US010625798B2

(12) United States Patent
Lafreniere et al.

(10) Patent No.: US 10,625,798 B2
(45) Date of Patent: Apr. 21, 2020

(54) GROUSER ASSEMBLY FOR ENDLESS TRACK SYSTEMS

(71) Applicant: SOUCY INTERNATIONAL INC., Drummondville (CA)

(72) Inventors: Pascal Lafreniere, St-Cyrille-de-Wendover (CA); Jean-Philippe Breton, St-Germain-de-Grantham (CA); Charles St-Arnaud, Trois-Rivieres (CA); Caroline Leclerc, Drummondville (CA); Charles Devin, Windsor (CA); Pierre-Yves Pettigrew, Lyster (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 60 days.

(21) Appl. No.: 15/699,675

(22) Filed: Sep. 8, 2017

(65) Prior Publication Data
US 2018/0127037 A1    May 10, 2018

Related U.S. Application Data

(60) Provisional application No. 62/385,645, filed on Sep. 9, 2016.

(51) Int. Cl.
*B62D 55/28* (2006.01)
*B62D 55/24* (2006.01)

(52) U.S. Cl.
CPC ............ *B62D 55/28* (2013.01); *B62D 55/244* (2013.01)

(58) Field of Classification Search
CPC .... B62D 55/28; B62D 55/286; B62D 55/244; B62D 55/26
See application file for complete search history.

(56) References Cited

U.S. PATENT DOCUMENTS

| 1,395,134 A | 10/1921 | Messner |
| 3,765,731 A | 10/1973 | Kilbane |

(Continued)

FOREIGN PATENT DOCUMENTS

| CA | 2690367 A1 * | 7/2011 | ............ B62D 55/28 |
| CN | 2223235 Y | 3/1996 | |

(Continued)

OTHER PUBLICATIONS

English abstract of DE 10354486 retrieved from Espacenet on Aug. 21, 2017.

(Continued)

*Primary Examiner* — Kip T Kotter
(74) *Attorney, Agent, or Firm* — BCF LLP (57) ABSTRACT

A grouser assembly is selectively attachable to an endless track having a carcass, side edges and traction lugs. The grouser assembly includes a body having top and bottom faces. The body includes a recess defined in the bottom face that is shaped to receive a traction lug of the endless track. The grouser assembly further includes ground-contacting projections connected to the body and extending away from the top face, and first and second attachment assemblies connected to the body. The second attachment assembly has an attached configuration and a released configuration, and is positioned relative to the first attachment assembly such that when (i) the traction lug is received in the recess, (ii) the first attachment assembly attaches the grouser assembly to the carcass, and (iii) the second attachment assembly is in the attached configuration, the second attachment assembly attaches the grouser assembly to the endless track.

19 Claims, 11 Drawing Sheets

(56) References Cited

U.S. PATENT DOCUMENTS

| | | | |
|---|---|---|---|
| 3,857,617 A | 12/1974 | Grawey | |
| 4,027,925 A * | 6/1977 | Black | B62D 55/275 |
| | | | 305/46 |
| 4,070,071 A | 1/1978 | Caravito | |
| 4,071,068 A | 1/1978 | Olsen | |
| 4,109,971 A | 8/1978 | Black et al. | |
| 4,165,137 A | 8/1979 | Stedman | |
| 4,597,612 A | 7/1986 | Kaizaki | |
| 5,388,900 A | 2/1995 | Suzuki | |
| 5,769,511 A | 6/1998 | Hattori | |
| 6,412,888 B1 | 7/2002 | Miyoshi | |
| 6,540,310 B1 * | 4/2003 | Cartwright | B62D 55/28 |
| | | | 305/160 |
| 6,557,954 B1 | 5/2003 | Hattori | |
| 7,901,015 B1 | 3/2011 | Anderson | |
| 8,011,739 B2 | 9/2011 | Busley | |
| 8,016,369 B2 | 9/2011 | Breton et al. | |
| 8,424,981 B1 | 4/2013 | Stratton, Jr. | |
| 9,260,145 B2 | 2/2016 | Korus et al. | |
| 2003/0184157 A1 | 10/2003 | McNutt | |
| 2010/0193263 A1 | 8/2010 | Kaiser et al. | |
| 2013/0049452 A1 | 2/2013 | Burling | |
| 2017/0158268 A1 | 6/2017 | Tibbits | |

FOREIGN PATENT DOCUMENTS

| | | | |
|---|---|---|---|
| DE | 10354486 B3 | | 3/2005 |
| EP | 518719 B1 | | 9/2006 |
| JP | H1016836 A | | 1/1998 |
| JP | H1016837 A | | 1/1998 |
| JP | 2002187582 A | * | 7/2002 |
| JP | 2002/264855 A | | 9/2002 |
| JP | 3399871 B2 | | 4/2003 |
| JP | 2003118661 A | * | 4/2003 |
| JP | 2004027316 A | | 1/2004 |
| JP | 3869833 B2 | | 1/2007 |
| WO | 1983/003582 A1 | | 10/1983 |
| WO | 2014/030927 A1 | | 2/2014 |
| WO | 2016/123687 A1 | | 8/2016 |

OTHER PUBLICATIONS

English abstract of EP 518719 retrieved from Espacenet on Aug. 21, 2017.
English abstract of JP H1016837 retrieved from Espacenet on Aug. 21, 2017.
English abstract of JPH1016836 retrieved from Espacenet on Aug. 21, 2017.
English abstract of JP20021264855 retrieved from Espacenet on Aug. 21, 2017.
English abstract of JP 3869833 retrieved from Espacenet on Aug. 21, 2017.
English abstract of JP3399871 retrieved from Espacenet on Aug. 21, 2017.
English abstract of CN2223235 retrieved from Espacenet on Aug. 21, 2017.
English abstract of JP2004027316 retrieved from Espacenet on Aug. 21, 2017.

* cited by examiner

GROUSER ASSEMBLY FOR ENDLESS TRACK SYSTEMS

CROSS-REFERENCE TO RELATED APPLICATIONS

The present application claims priority to U.S. Provisional Patent Application Ser. No. 62/385,645, filed Sep. 9, 2016, entitled "Hill climber", which is incorporated by reference herein in its entirety.

TECHNICAL FIELD

The present technology relates to grouser assemblies for endless track systems.

BACKGROUND

Certain vehicles, such as agricultural vehicles (e.g., harvesters, combines, tractors, agricultural implements, etc.) and construction vehicles (e.g., bulldozers, front-end loaders, etc.) for example, are used to perform work on ground surfaces that are soft, slippery and/or uneven (e.g., on soil, mud, sand, ice, snow, etc.).

Conventionally, such vehicles have had large wheels with tires on them to move the vehicle along the ground surface. Under certain conditions, such tires may have poor traction on some specific types of ground surface and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. In order to reduce the aforementioned drawbacks, to increase traction and to distribute the weight of the vehicle over a larger area on the ground surface, track systems were developed to be used in place of at least some of the wheel and tire assemblies on the vehicles.

Such conventional track systems designed for agricultural vehicles typically have elastomeric endless tracks. The endless tracks have traction lugs projecting from the track carcass to increase traction on different ground surfaces. However, when the track system is driven over snowy or icy surfaces, the endless track may lack traction and/or slip on such surfaces.

Known solutions exist to enhance the traction of an endless metallic track over snowy or icy surfaces. For instance, grouser assemblies may be selectively attached to metallic endless tracks. However, it is difficult to directly transpose the grouser assemblies designed for metallic endless track to elastomeric endless tracks because of the physical characteristics of the materials that compose the endless track. For example, because of the flexibility and resiliency of the carcass of an elastomeric track, a grouser assembly that was originally designed to be attached to a metallic endless track, which is much more rigid, may be more prone to move about or slip relative to the outer surface of the elastomeric endless track under certain conditions, such as when the vehicle is driven over steep terrain. Such movement of the grouser assemblies on the endless track may mitigate the enhanced traction provided by the grouser assemblies and may lead to damages to the endless track and/or the vehicle.

Therefore, improvements to grouser assemblies for elastomeric endless tracks are desired.

SUMMARY

It is therefore an object of the present technology to ameliorate at least one of the inconveniences present in the prior art.

It is also an object of the present invention to provide a selectively attachable grouser assembly for an elastomeric endless track system which is improved in at least some instances as compared with some of the prior art.

In the present specification, the terms "longitudinally" and "longitudinal" mean in a direction parallel to the direction of travel of the endless track, when it is driven by the endless track system. The terms "laterally" and "lateral" mean in a direction transverse to the longitudinal direction of the endless track. The terms "vertically" and "vertical" mean in a direction perpendicular to a plane formed by the longitudinal and lateral directions.

According to an aspect of the present technology, there is provided a grouser assembly that is selectively attachable to an elastomeric endless track of an endless track system. The elastomeric endless track has a carcass with first and second side edges and a ground-engaging outer surface, from which traction lugs project.

The grouser assembly includes a body having top and bottom faces. The body includes a recess defined in the bottom face of the body. The recess is shaped to receive at least one traction lug of the traction lugs of the endless track in the recess.

The grouser assembly further includes ground-contacting projections connected to the body. The projections extend away from the top face of the body such that when the grouser assembly is attached to the endless track the projections extend beyond the traction lugs, such that the projections contact the ground before the traction lugs.

The grouser assembly further includes a first attachment assembly connected to the body for attaching the grouser assembly to the carcass of the endless track, and a second attachment assembly connected to the body also for attaching the grouser assembly to the carcass of the endless track. The second attachment assembly has an attached configuration and a released configuration. The second attachment assembly is positioned relative to the first attachment assembly such that when (i) the traction lug is received in the recess, (ii) the first attachment assembly attaches the grouser assembly to the carcass of the endless track, and when (iii) the second attachment assembly is in the attached configuration, the second attachment assembly attaches the grouser assembly to the endless track.

The grouser assembly of the present technology is directed in part towards improving the attachment of the grouser assembly to the endless track without using fasteners extending through the carcass of the endless track. As mentioned above, the body has a recess defined in the bottom face thereof, and when the grouser assembly is attached to the endless track, at least one traction lug is received in the recess, and the grouser assembly is maintained in position on the endless track (and does not slide out of place) at least in part by the abutment of a wall of the recess with a wall of the traction lug that is received in the recess. As a result, under certain circumstances, such an abutment may limit the grouser assembly from slipping over the outer surface of the endless track along the longitudinal and lateral directions when the endless track system is driven.

In some embodiments of the grouser assembly of the present technology, when the grouser assembly is attached to the endless track, a sidewall of the body is disposed within a valley of the endless track. The valley extends laterally across the ground-engaging outer surface of the endless track between a plurality of traction lugs of the traction lugs. Such positioning of the sidewall of the body may, under certain circumstances, assist the grouser assembly in maintaining its position with respect to the ground-engaging outer surface of the endless track when the endless track system is driven.

In some embodiments of the grouser assembly of the present technology, when the grouser assembly is attached to the endless track, the top and bottom faces of the body extend parallel to the outer surface of the endless track. Under certain conditions, this feature may assist in allowing embodiments of the grouser assembly of the present technology to be efficiently manufactured and mechanically packaged, in embodiments where such is judged to be important.

In some embodiments, the recess is an aperture extending from the bottom face to the top face of the body of the grouser assembly. Defining such an aperture in the body may assist in reducing the mass of the grouser assembly and facilitate the manufacturing thereof, in embodiments where such is judged to be important.

In some embodiments of the grouser assembly of the present technology, when the grouser assembly is attached to the endless track, an upper portion of the traction lug extends through the aperture. In some embodiments, an upper portion of the traction lug extends vertically beyond the top face of the body. Under certain circumstances, having the upper portion of the traction lug extending vertically beyond the top face of the body may facilitate the ejection of dirt, sand and/or snow from the body of the grouser assembly when the endless track is driven.

In some embodiments, when the grouser assembly is attached to the endless track, the recess is a plurality of recesses and the traction lug is a plurality of traction lugs, and each recess of the plurality of recesses receives one of the plurality of traction lugs.

In some embodiments, when the grouser assembly is attached to the endless track, the first attachment assembly includes a first hook facing and engaging with the first side edge of the carcass of the endless track. The second attachment assembly includes a second hook facing and engaging with the second side edge of the carcass of the endless track when in the attached configuration. In some embodiments, the use of such hooks is in line with one of the objects of the present technology, which is to have a grouser assembly that is selectively attachable to an elastomeric endless track and that is free of fasteners extending within the carcass of the endless track. Such configuration of grouser assembly presents the advantage that, in some embodiments, the grouser assembly may be selectively attached to an endless track without requiring any additional hardware and/or modifications to the endless track.

In some embodiments of the grouser assembly of the present technology, the second attachment assembly is pivotably movable with respect to the body of the grouser assembly between the released configuration and the attached configuration.

In some embodiments, the grouser assembly further includes a fastener slidably engaging the second attachment assembly through a through hole defined in the second attachment assembly. The fastener is also threadedly engageable to the body of the grouser assembly. The fastener can thus limit the pivotal motion of the second attachment assembly and maintain it in the attached configuration when threadedly engaged to the body.

In some embodiments, the second attachment assembly is slidably movable with respect to the body. In some embodiments, the grouser assembly further has a fastener releasably clamping the second attachment assembly to the body of the grouser assembly as the fastener extends through slotted holes defined in at least one of the second attachment assembly and the body. This feature may assist in attaching the grouser assembly to different endless tracks having different carcass widths.

In some embodiments, the first attachment assembly is movable with respect to the body, and the first attachment assembly has a released configuration and an attached configuration. In some such embodiments, the first attachment assembly may be structurally similar to the second attachment assembly, but this is not required to be the case. This feature may assist in facilitating the attachment of the grouser assembly to an elastomeric endless track of an endless track system, regardless of the side of the vehicle on which it is located.

In some embodiments of the grouser assembly of the present technology, the body and the ground-contacting projections are integrally formed. This feature may assist in allowing embodiments of the grouser assembly of the present technology to be efficiently manufactured and mechanically packaged, in embodiments where such is judged to be important.

In some embodiments, the ground-contacting projections include a plurality of teeth. Under certain circumstances, when the grouser assembly is attached to the endless track and when the endless track system is driven, the plurality of teeth may enhance the ground engagement of the grouser assembly, and therefore may enhance the traction of the endless track over the ground surface.

In some embodiments, the grouser assembly further has a shoe connected to a bottom edge of the sidewall of the body. When the grouser assembly is attached to the endless track, the shoe abuts a wall of at least one traction lug of the traction lugs. Such an abutment of the shoe may further limit the slipping of the grouser assembly over the outer surface of the endless track along the longitudinal direction. In addition, when the grouser assembly is attached to the endless track and the endless track system is driven, the shoe may also assist in reducing the wear of the outer surface of the endless track because the shoe may prevent that a sharp edge of the body cut the carcass of the endless track or rub on the outer surface of the endless track.

In some embodiments of the grouser assembly of the present technology, the body of the grouser assembly has front and rear sidewalls. When the grouser assembly is attached to an elastomeric endless track that includes drive lugs located on an inner surface opposite to the outer ground-engaging surface, the body of the grouser assembly is dimensioned such that the front sidewall is located in the front of a drive lug of the drive lugs, and the rear sidewall is located at the rear of the drive lug of the drive lugs. Under certain conditions, this feature may limit the stretching of an endless track segment that has the grouser assembly attached thereto as the endless track wraps around the idler wheel assemblies and/or the sprocket wheel of the endless track system.

In some embodiments, when the grouser assembly is attached to the endless track, the grouser assembly is maintained in its position on the endless track at least in part by the abutment of a sidewall of the body with a wall of at least one traction lug of the traction lugs. Such an abutment of the sidewall of the body may, under certain circumstances, further limit the grouser assembly from slipping relative to the outer surface of the endless track when the endless track system is driven.

In some embodiments, the recess is shaped to register with a wall of the traction lug that is received in the recess. This feature reduces the accumulation of dirt, sand or snow between the bottom face of the body and the outer surface of the endless track. Combined with the features that, in some embodiments, the front and rear sidewalls extend within valleys of the endless track and that the first and second attachment assemblies include hooks engaging with the side edges of the carcass of the endless track, a spacing between the bottom face of the body of the grouser assembly and the outer surface of the endless track remains mostly free of dirt, sand or snow. Under certain circumstances, this feature may assist the grouser assembly to remain being attached to the endless track because there are no accumulated debris that would thrust the grouser assembly vertically off the endless track.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Introduction

With reference to FIGS. 1 to 9, a grouser assembly 40 for endless track systems 180 (FIGS. 8 and 9) is shown. The grouser assembly 40 is structured and arranged to be selectively attachable to an elastomeric endless track 200 (FIGS. 4 to 9) of the endless track system 180. It is contemplated that the grouser assembly 40 could be attached to the endless track 200 under circumstances where improved traction is desired, such as when the endless track system 180 is to be driven over icy and/or snowy ground surfaces, or to be driven over steep terrain. The grouser assembly 40 is removable from the endless track 200 when no longer needed. Although only one single grouser assembly 40 is shown in each of the Figures, it is contemplated that a plurality of grouser assemblies could be attached to the endless track 200 to enhance the traction thereof.

It should be understood that the grouser assembly 40 is merely an embodiment of the present technology. Thus, the description thereof that follows is intended to be only a description of illustrative examples of the present technology. This description is not intended to define the scope or set forth the bounds of the present technology.

Examples of modifications or alternatives to the grouser assembly 40 are described below. This is done merely as an aid to understanding, and, again, not to define the scope or set forth the bounds of the present technology. These modifications are not an exhaustive list, and, as a person skilled in the art would understand, other modifications are likely possible.

Further, where this has not been done (i.e. where no examples of modifications have been set forth), it should not be interpreted that no modifications are possible and/or that what is described is the sole manner of implementing or embodying that element of the present technology.

In addition, it is to be understood that the grouser assembly 40 may provide in certain aspects a simple embodiment of the present technology, and that where such is the case it has been presented in this manner as an aid to understanding. As persons skilled in the art would understand, various embodiments of the present technology may be of a greater complexity than what is described herein.

General Description of the Endless Track System

Referring to FIGS. 5 to 9, in this illustration, the endless track system 180 is to be used on a vehicle (not shown) in replacement of at least one of its wheel and tire assemblies. The endless track system 180 includes the elastomeric endless track 200 that is made of polymeric materials. The endless track 200 has a carcass 202 (FIGS. 5 and 6) that may be constructed of a wide variety of materials and structures, including polymeric and metallic components known in endless track systems. The specific properties and materials of the endless track 200 are not central to the present technology and will not be described in detail.

Figure 6:
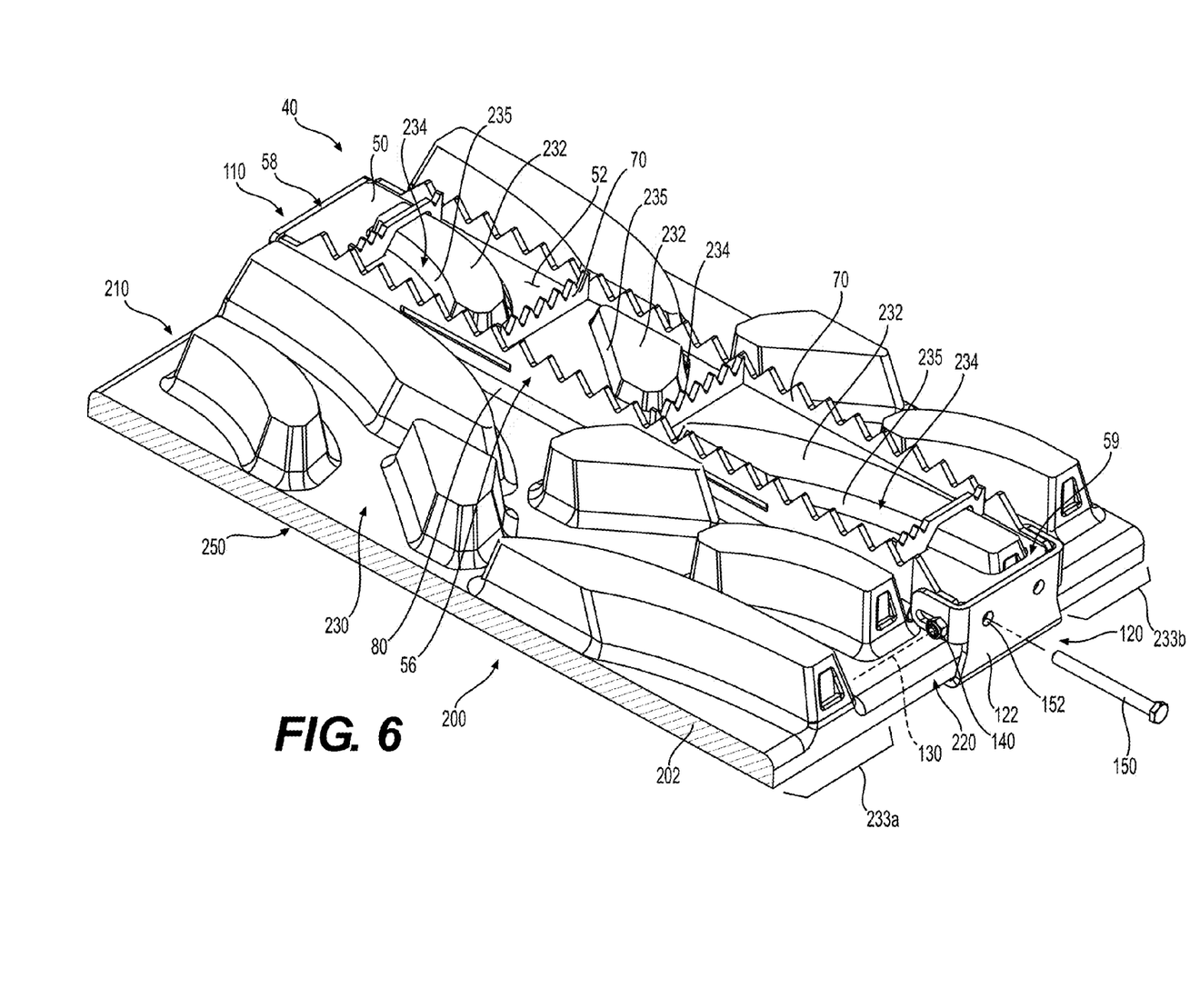
FIG. 6 is an isometric view taken from a top, rear, right side of the grouser assembly and the segment of the endless track of FIG. 5, with the other attachment assembly of the grouser assembly in an attached configuration and engaging the other side edge of the segment of the endless track.
Figure 7:
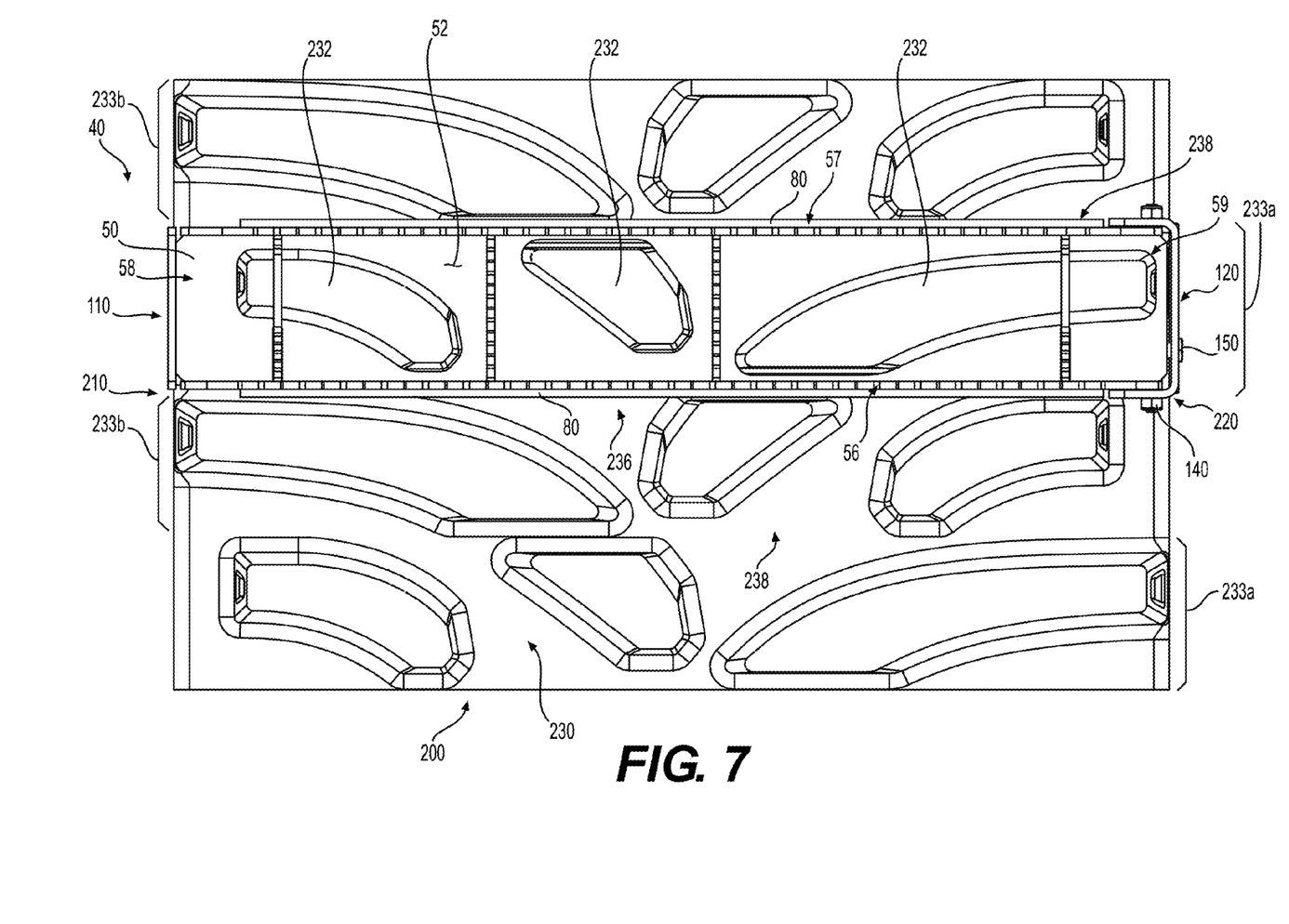
FIG. 7 is a top plan view of the grouser assembly and the segment of the endless track of FIG. 6, with the grouser assembly attached to the endless track.
Figure 8:
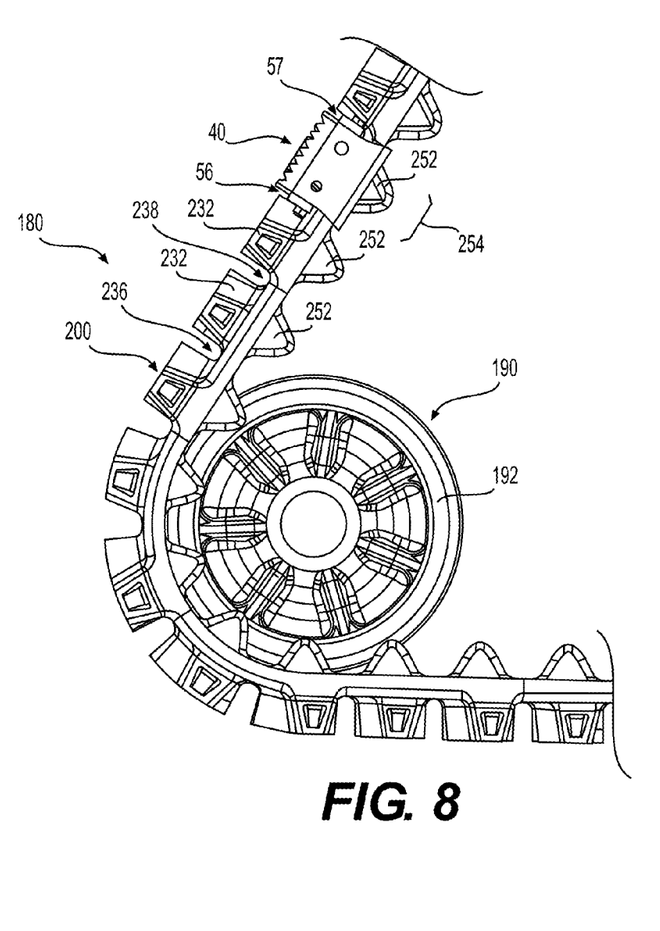
FIG. 8 is a right side elevation view of a portion of an endless track and of an idler wheel assembly, with the grouser assembly of FIG. 1 attached to the endless track.
Figure 9:
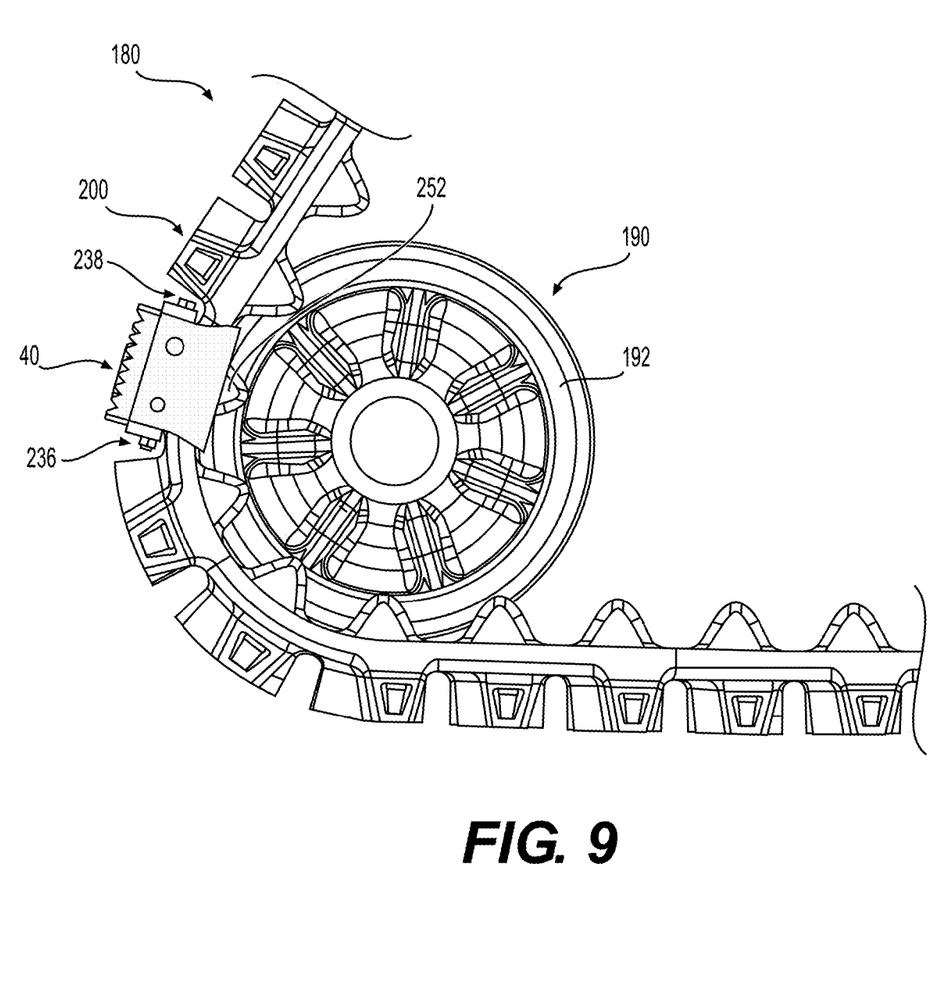
FIG. 9 is a right side elevation view the portion of the endless track and the idler wheel assembly of FIG. 8, with the grouser assembly of FIG. 1 attached to a segment of the endless track wrapping around the idler wheel assembly.

The carcass 202 of the endless track 200 has side edges 210, 220. The endless track 200 has a ground-engaging outer surface 230 including spaced-apart traction lugs 232 projecting from the outer surface 230. The traction lugs 232 project along laterally extending rows 233a, 233b (FIGS. 6 and 7) on the outer surface 230 of the endless track 200. The rows 233a, 233b are placed in an alternating arrangement along the longitudinal direction of the endless track 200 so as to form a pattern of traction lugs 232 over the outer surface 230. The arrangement of the rows 233a, 233b is repeated over the outer surface 230 along the longitudinal direction. Each row 233a, 233b has three laterally spaced-apart traction lugs 232. It is contemplated that the shape and size of the traction lugs 232 on the rows 233a and on the rows 233b could differ. As best shown in FIGS. 7 to 9, the rows 233a, 233b of traction lugs 232 are longitudinally spaced-apart and the rows 233a, 233b define laterally extending valleys 236, 238 therebetween. Each valley 236, 238 extend laterally across the endless track 200. Referring to FIG. 6, each traction lug 232 includes an upper portion 234 and a plurality of walls 235 extending away from the outer surface 230 of the endless track 200. The arrangement of the traction lugs 232 on the outer surface 230 of the endless track 200 will vary in other embodiments from the one shown in the Figures.

The carcass 202 of the endless track 200 further has an inner surface 250 including drive lugs 252. The drive lugs 252 are defined on laterally extending rows 254 (FIGS. 4 and 8) projecting from a central portion of the inner surface 250. Each row 254 has three laterally spaced-apart drive lugs 252. Again, the arrangement of the drive lugs 252 on the inner surface 250 of the endless track 200 will vary in other embodiments from the one shown in the Figures. The drive lugs 252 are structured and arranged to engage a sprocket wheel (not shown) of the endless track system 180 for driving the endless track 200.

Figure 5:
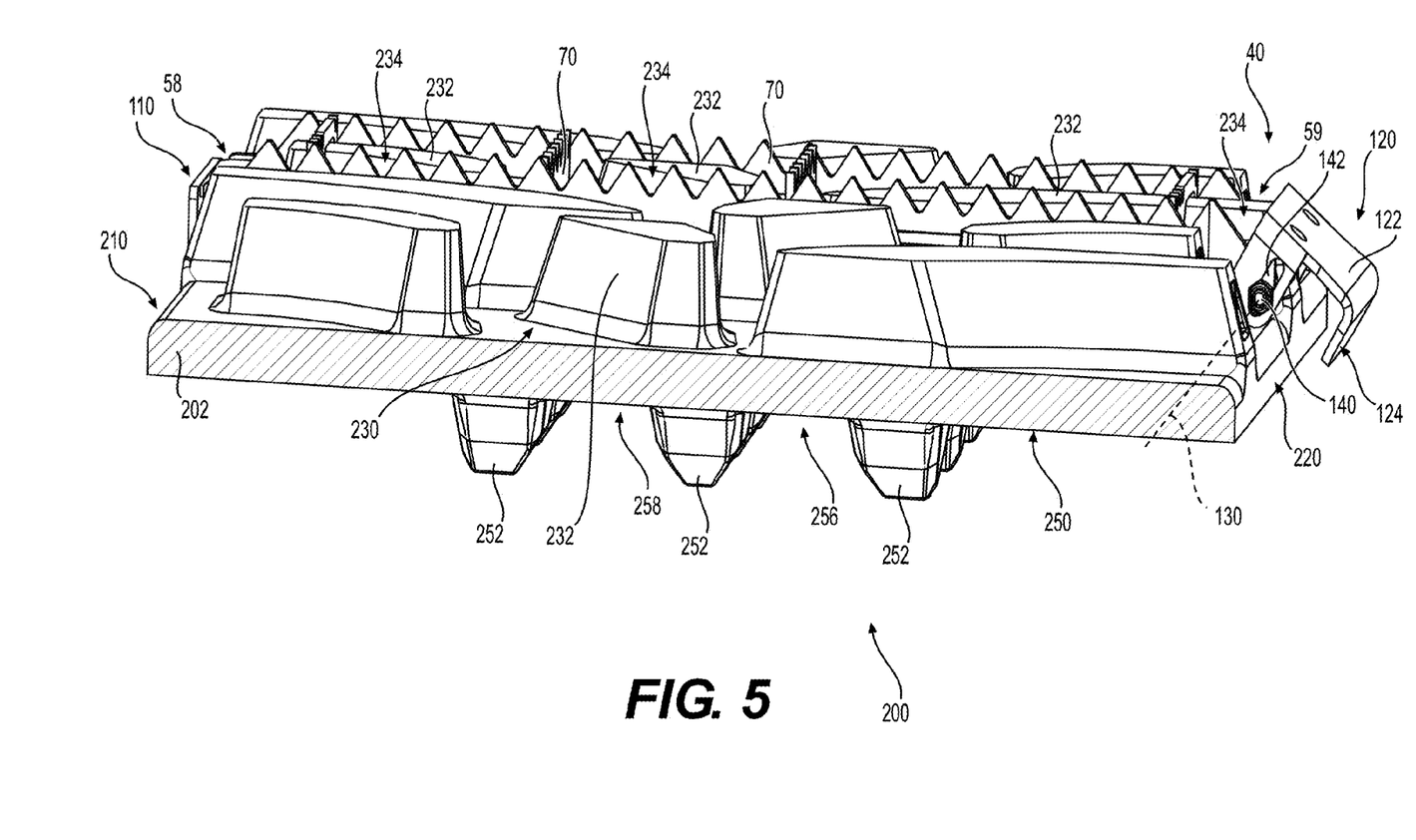
FIG. 5 is an isometric view taken from a rear, right side of the grouser assembly and the segment of the endless track of FIG. 4, with the other attachment assembly of the grouser assembly in a released configuration.

The inner surface 250 of the carcass 202 of the endless track 200 also engages idler wheel assemblies 190 (only one idler wheel assembly is shown in FIGS. 8 and 9) of the endless track system 180 for guiding the endless track 200. The idler wheel assemblies 190 have two laterally spaced-apart idler wheels 192 (only one idler wheel 192 is shown in FIGS. 8 and 9). The idler wheels 192 extend within the valleys 256, 258 defined between the three laterally spaced-apart drive lugs 252 of each row 254 (FIGS. 5 and 8—although unlabeled in FIG. 8). Having the idler wheels 192 extending in the valleys 256, 258 may reduce the risk of the endless track 200 detracking from the idler wheel assemblies 190 of the endless track system 180.

General Description of the Grouser Assembly

Referring to FIGS. 1 to 3B, the grouser assembly 40 will be generally described. The grouser assembly 40 includes a body 50 having a top face 52 and a bottom face 54 (FIG. 2B). The body 50 includes apertures 60 extending from the bottom face 54 through to the top face 52. Each aperture 60 is shaped to receive one of the traction lugs 232 of the endless track 200. The grouser assembly 40 further has ground-contacting projections 70 extending away from the top face 52 of the body 50 such that when the grouser assembly 40 is attached to the endless track 200, the projections 70 extend vertically beyond the traction lugs 232, as best seen in FIGS. 5 and 6. The grouser assembly 40 further has attachment assemblies 110, 120 connected to the body 50. The attachment assembly 120 has a released configuration (FIG. 5) and an attached configuration (FIG. 6). The attachment assembly 120 is structured, arranged, and positioned relative to the attachment assembly 110 such that when (i) the traction lugs 232 are received in the apertures 60 of the body 50, (ii) the attachment assembly 110 engages the side edge 210, and (iii) the attachment assembly 120 is in the attached configuration, the attachment assemblies 110, 120 attach the grouser assembly 40 to the endless track 200.

Referring to FIGS. 1 to 3B, the top face 52 and the bottom face 54 of the body 50 are parallel. When attached to the endless track 200 and as shown in FIGS. 5 and 6, the top and bottom faces 52, 54 extend parallel to the outer surface 230 of the carcass 202 of the endless track 200. It is contemplated that the top face 52 and/or the bottom face 54 will extend otherwise in other embodiments.

Figure 1:
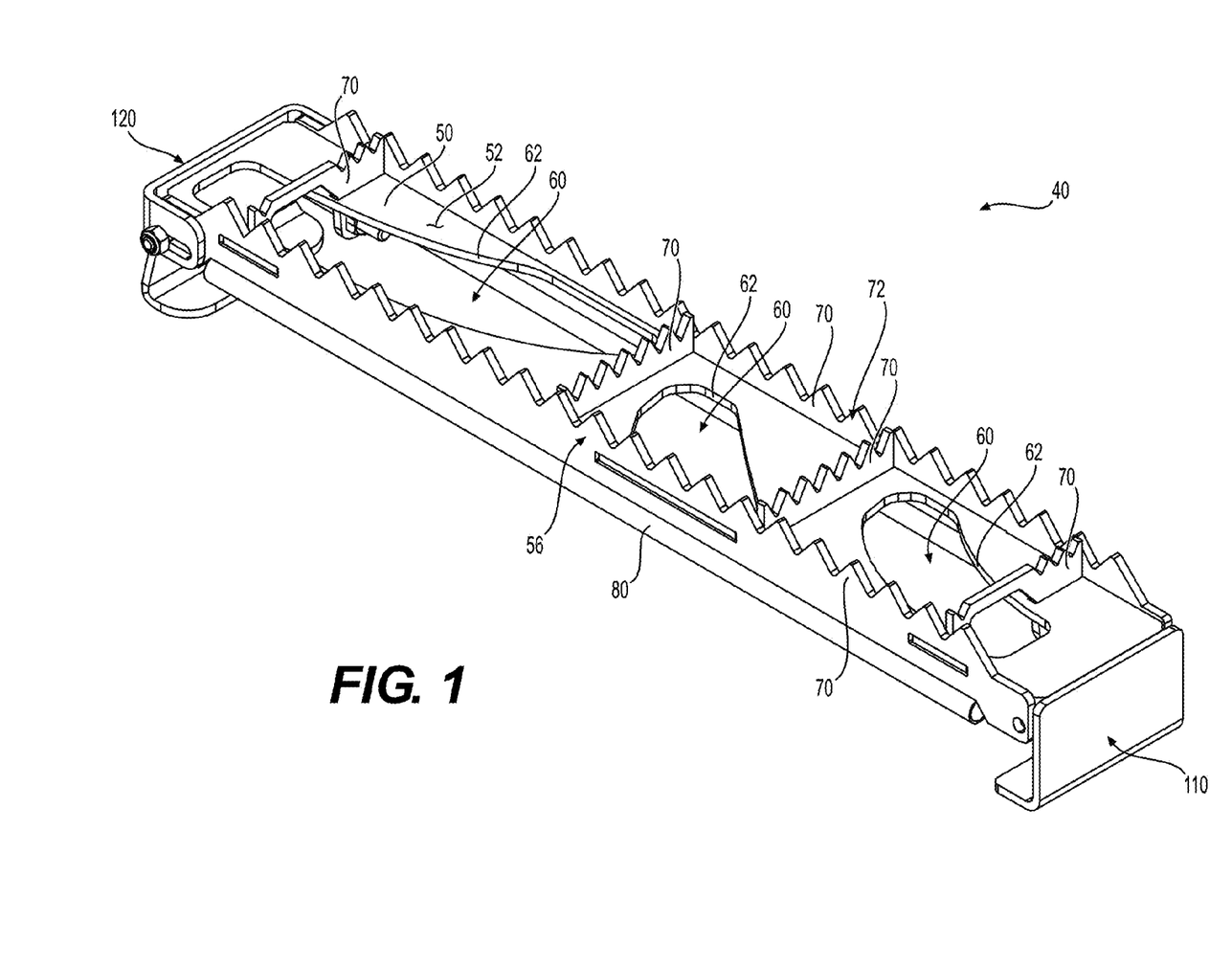
FIG. 1 is an isometric view taken from a top, front, left side of a grouser assembly in accordance with the present technology.

Referring to FIGS. 1 and 6, each one of the apertures 60 has a wall 62 and each one of the apertures 60 is shaped to fittingly receive a corresponding one of the traction lugs 232 therein. In other words, the wall 235 of each traction lug 232 registers exactly with the wall 62 of the corresponding aperture 60. When the grouser assembly 40 is attached to the endless track 200, the grouser assembly 200 is maintained in its position on the endless track 200 (and does not slide over) at least in part by the abutment of the wall 62 of each aperture 60 with the wall 235 of the traction lug 232 extending therethrough.

In some embodiments, it is contemplated that more than one traction lug 232 could be received in a single aperture 60. It is also contemplated that the apertures 60 could be shaped to loosely receive one or more traction lugs 232 therein. In other embodiments, the shape of the apertures 60 varies (or will vary) from the one shown in the Figures.

It can be seen in FIGS. 5 and 6 that, when the grouser assembly 40 is attached to the endless track 200, the upper portion 234 of each traction lug 232 extends through the corresponding aperture 60, and the upper portion 234 of each traction lug 232 extends vertically beyond the top face 52 of the body 50. The upper portion 234 of each traction lug 232 also extends vertically below the top of the projections 70. The upper portion 234 of each traction lug 232 corresponds to the portion of the traction lug 232 that includes the edge of the walls 235 that extend along the top face of the traction lug 232.

In alternative embodiments, it is contemplated that the apertures 60 would instead be recesses defined in the bottom face 54 of the body 50. In an embodiment, each one of the recesses would be sized and shaped to receive a corresponding one of the traction lugs 232 therein. When the grouser assembly 40 would be attached to the endless track 200, each recess would have a wall on which the wall 235 of the traction lug 232 that is received therein could abut. In such embodiments, the top face 52 of the body 50 would extend vertically beyond the upper portion 234 of each traction lug 232.

Referring to FIGS. 4 to 7, when the grouser assembly 40 is attached to the endless track 200, a front sidewall 56 and a rear sidewall 57 (FIG. 7) of the body 50 are disposed within the laterally extending valleys 236, 238 of the endless track 200 respectively.

Referring back to FIGS. 1 to 3B, the grouser assembly 40 further includes the ground-contacting projections 70 that are connected to the body 50 and that extend away from the top face 52 of the body 50. In the embodiment shown, the projections 70 are integrally formed with the body 50, but in some embodiments the projections 70 are provided as separate components and connected to the body 50 using suitable known techniques, such as welding. The projections 70 extend vertically and perpendicular to the top face 52 of the body 50. The projections 70 also extend laterally and longitudinally over the top face 52 of the body 50. The projections 70 also include a plurality of teeth 72.

Still referring to FIGS. 1 to 3B, shoes 80 are connected to the bottom edge of the front and rear sidewalls 56, 57 of the body 50. When the grouser assembly 40 is attached to the endless track 200, the shoes 80 are disposed within the valleys 236, 238. The shoes 80 abut with the walls 235 of at least some of the drive lugs 232 that are in one row 233a, and the walls 235 of at least some of the drive lugs 232 that are in one row 233b. In some embodiments, the shoes 80 could be connected to the bottom face 54 of the body 50, or omitted. In such embodiments, the front sidewall 56 and/or the rear sidewall 57 could abut with the walls 235 of at least some of the drive lugs 232 that are in one row 233a, and the walls 235 of at least some of the drive lugs 232 that are in one row 233b.

Referring to FIGS. 8 and 9, the grouser assembly 40 can be seen attached to the endless track 200, and about to be driven around one of the idler wheel assemblies 190. The body 50 of the grouser assembly 40 is dimensioned such that the front sidewall 56 of the body 50 is located in the front of one of the rows 254 of laterally spaced-apart drive lugs 252, and the rear sidewall 57 is located at the rear of the laterally spaced-apart drive lugs 252 of the same row 254. Such dimensioning of the body 50 and the resulting positioning of the grouser assembly 40 on the endless track 200 may facilitate the bending of the endless track 200 such that it wraps around the sprocket wheel and the idler wheel assemblies 190 when the endless track system 180 is driven.

Attachment Assemblies

Figure 4:
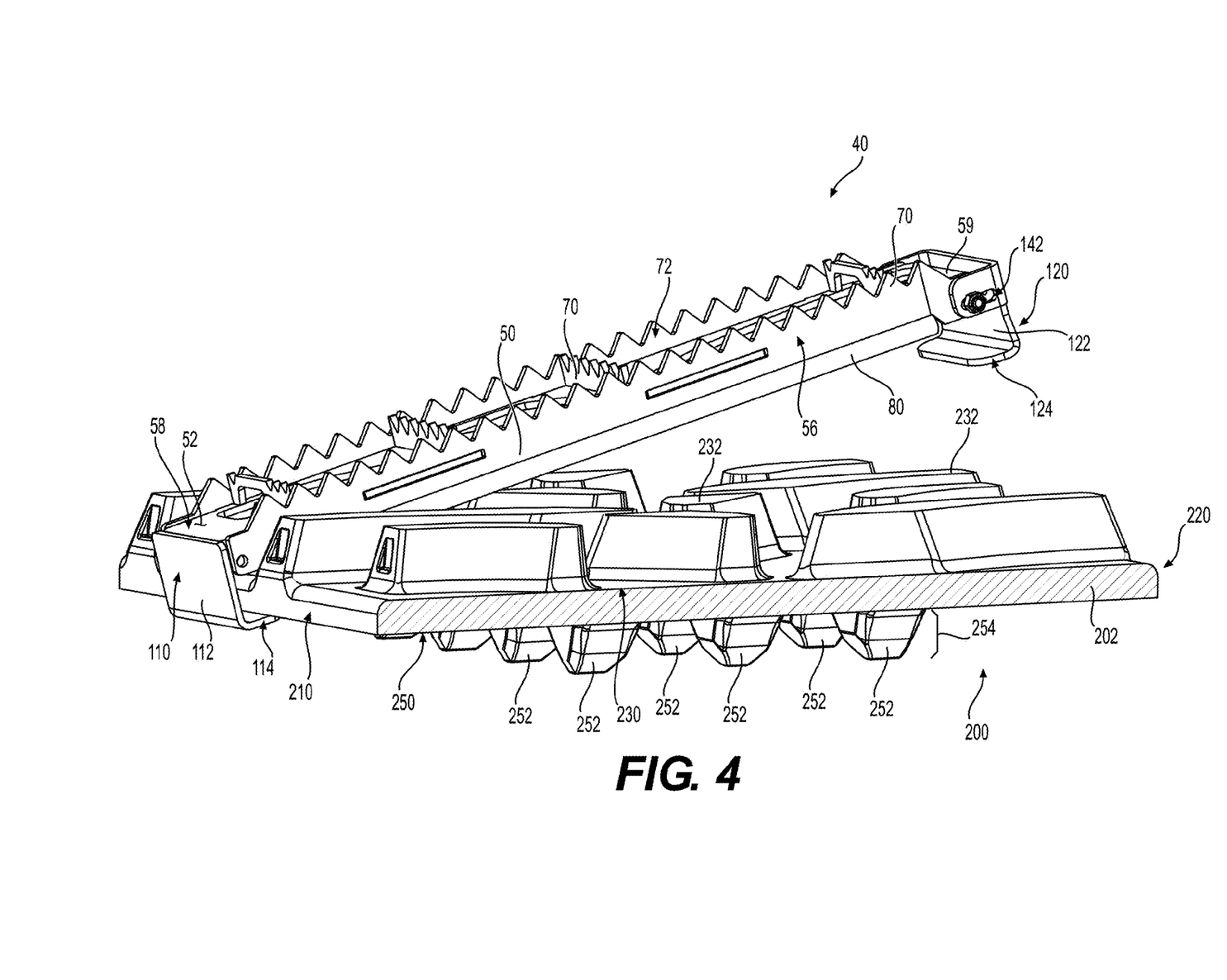
FIG. 4 is an isometric view taken from a rear, left side of the grouser assembly of FIG. 1 and of a segment of an elastomeric endless track, with an attachment assembly of the grouser assembly engaging a side edge of the carcass of the segment of the endless track.

Referring to FIGS. 4 to 6, the left and right attachment assemblies 110, 120 attaching the grouser assembly 40 to the endless track 200 will be described.

The left attachment assembly 110 is connected to a left side 58 of the body 50. The attachment assembly 110 includes a hook 112 facing toward the side edge 210 of the carcass 202 of the endless track 200 (when the grouser assembly 40 is correctly oriented). The hook 112 is L-shaped and has a laterally extending portion 114. The size and arrangement of the hook 112 can be selected according to, for example, the forces the hook 112 will be subjected to, its material of construction, and the thickness of the side edge 210 of the carcass 202 of the endless track 200. When the hook 112 engages the side edge 210 of the carcass 202 of the endless track 200, the portion 114 extends vertically and horizontally beyond the side edge 210, and parallel to the inner surface 250 of the endless track 200.

The attachment assembly 120 is connected to a right side 59 of the body 50 of the grouser assembly 40 that is opposite to the left side 58. The attachment assembly 120 includes a hook 122 facing toward the side edge 220 of the carcass 202 of the endless track 200 (when the grouser assembly is correctly oriented). The hook 122 is L-shaped and has a laterally extending portion 124. The size and arrangement of the hook 122 can be selected according to, for example, the forces the hook 122 will be subjected to, its material of construction, and the thickness of the side edge 220 of the carcass 202 of the endless track 200. The attachment assembly 120 is pivotably movable with respect to the body 50 of the grouser assembly 40 and can be configured into a released configuration (FIG. 5) and an attached configuration (FIG. 6).

When the attachment assembly 120 is in the attached configuration, the hook 122 engages with the side edge 220 and the portion 124 extends vertically beyond and horizontally beyond the side edge 220, and parallel to the inner surface 250 of the endless track 200. As a result, the hooks 112, 122 retain the grouser assembly 40 to the endless track 200 by limiting the vertical displacement of the grouser assembly 40 with respect to the outer surface 230 of the endless track 200.

In order for the attachment assembly 120 to be configured between the released and attached configurations, the attachment assembly 120 pivots about a pivot axis 130 (FIGS. 5 and 6) defined by a fastener 140 connecting the hook 122 and the body 50 together. More particularly, the fastener 140 releasably clamps the attachment assembly 120 to the body 50 as the fastener 140 extends through slotted through holes 142 (only one is shown) defined in the hook 122 and in the body 50. To maintain the attachment assembly 120 into the attached position, a fastener 150 slidably engages the attachment assembly 120 through an unthreaded through hole 152 defined in the hook 122, and the fastener 150 threadedly engages the body 50. When the fastener 150 threadedly engages the body 50, the attachment assembly 120 is maintained in position by the clamping action of the fastener 150. To configure the attachment assembly 120 into the released configuration, the fastener 150 is unfastened and disengaged from the body 50, and the fastener 140 is loosened to allow the pivot motion of the attachment assembly 120. When the fastener 150 is unfastened and disengaged from the body 50, the fastener 150 no longer provides for clamping action.

The attachment assembly 120 is also slidably movable with respect to the body 50 as the hook 122 and the body 50 have the slotted through holes 142 and the fastener 140 extends therein. Thus, if needed and irrespective of the attachment assembly 120 being pivoted, the fastener 140 can be loosened to unclamp the attachment assembly 120 from the body 50 so that the attachment assembly 120 may slide towards or away from the body 50. Under certain circumstances, the combination of the pivot and slide motion of the attachment assembly 120 with respect to the body 50 may facilitate the attachment and removal of the grouser assembly 40 from the endless track 200. In addition, such configuration of the attachment assembly 120 may permit the grouser assembly 40 to be attached to endless tracks having a similar pattern of traction lugs 232, but a different thickness and/or width.

In some embodiments, the attachment assembly 110 could also be movable with respect to the body 50, whether through pivotable and/or slidable connection thereto. For example, the attachment assembly 110 could be a mirror image of the attachment assembly 120 described above.

It is to be noted that in the present embodiment, the attachment assemblies 110, 120 are free of fasteners extending within the carcass 202 of the endless track 200.

Referring to FIG. 6, it is also to be noted that in the present embodiment, because (i) the wall 235 of each traction lug 232 registers exactly with the wall 62 of the corresponding aperture 60 of the body 50, (ii) the front and rear sidewalls 56, 57 and the shoes 80 extend within the valleys 236, 238 of the endless track 200 and (iii) that the attachment assemblies 110, 120 include the hooks 112, 122 that are engaging with the side edges 210, 220 of the carcass 202 of the endless track 200, a spacing (not shown) between the bottom face 54 of the body 50 of the grouser assembly 40 and the outer surface 230 of the endless track 200 remains mostly free of dirt, sand or snow as such debris do not have much ways of passage for entering this spacing.

Materials and Manufacturing

The present technology does not require any specific materials nor methods of manufacture. The present technology merely requires that each component be suitable for the purpose for which it is intended and the use to which it is to be put. In the present embodiment, the grouser assembly 40 is made of sheets of a suitable metal, such as steel, that are cut to have the appropriate dimensions and features, and these sheets are then connected together using known techniques. However, any other material(s) or method(s) of manufacture may be used in the present technology.

Steps for Installing and Removing a Grouser Assembly on an Endless Track

In order to install the grouser assembly 40 on the elastomeric endless track 200, a user first identifies a row of traction lugs 232 that can be received within the apertures 60 of the body 50 of the grouser assembly 40. In the present embodiment and as described above, the grouser assembly 40 can receive the traction lugs 232 that are disposed along a row 233a of the endless track 200. The user places the grouser assembly 40 above the outer surface 230, then engages the attachment assembly 110 to the side edge 210 of the carcass 202 of the endless track 200, as shown in FIG. 4, and lowers the body 50 towards the outer surface 230 such that each one of the traction lugs 232 of the row 233a selected by the user is received within a corresponding aperture 60 of the body 50.

Figure 2A:
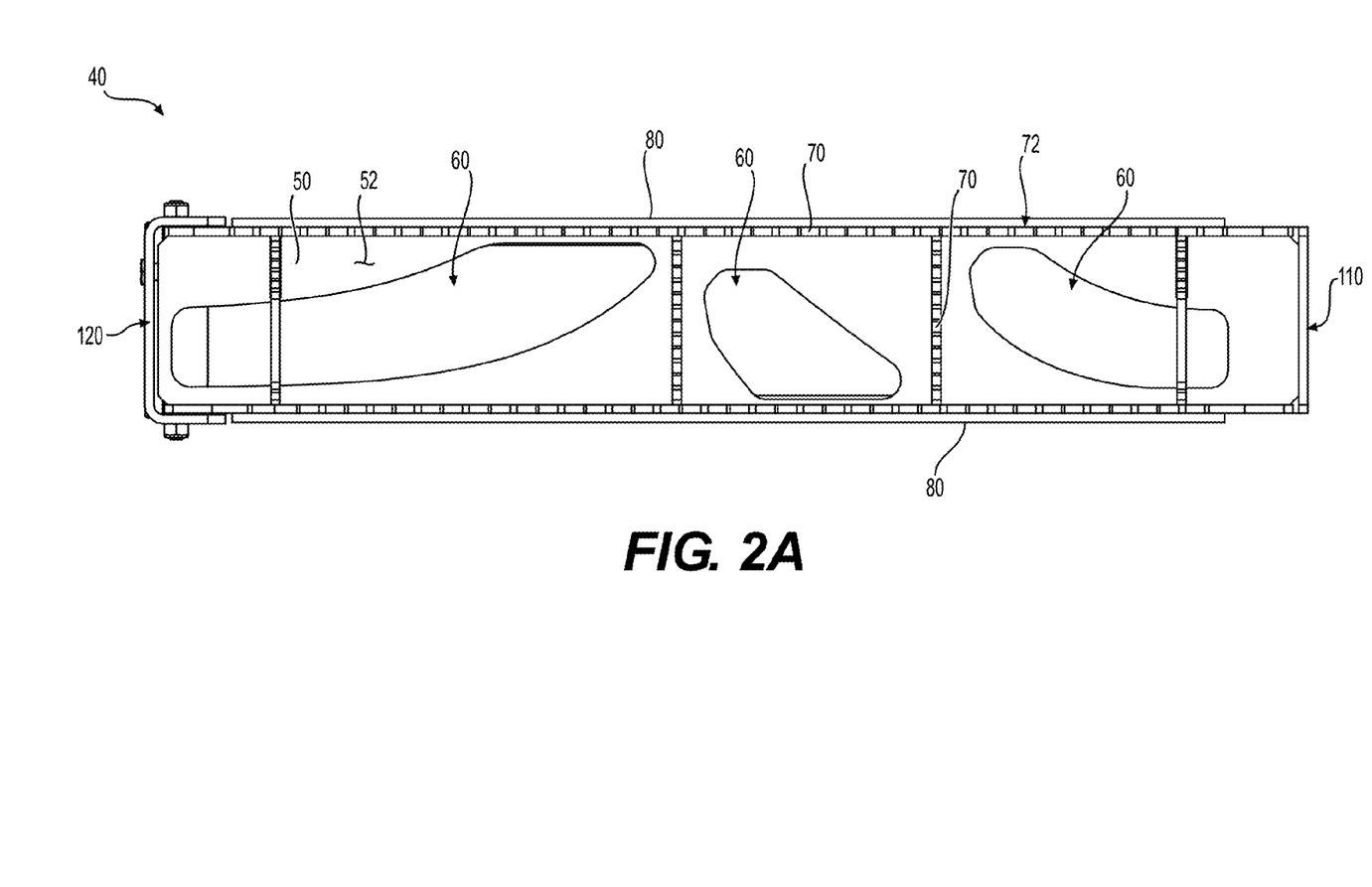
FIG. 2A is a top plan view of the grouser assembly of FIG. 1.
Figure 2B:
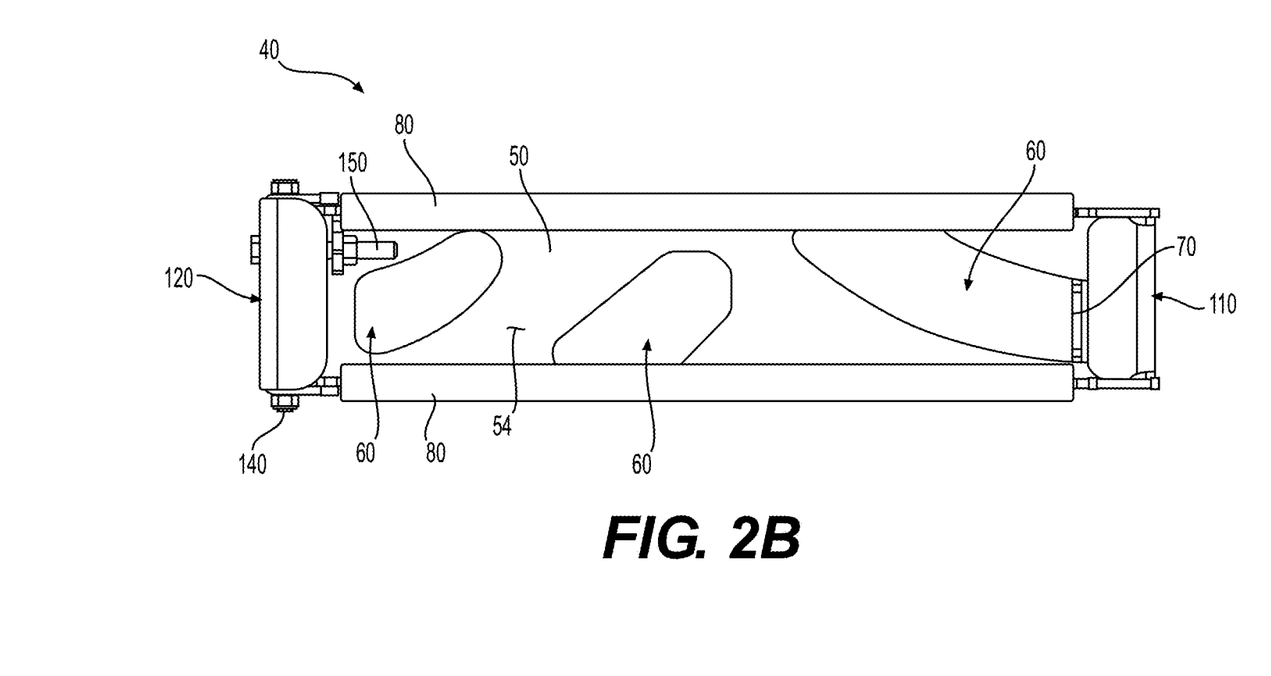
FIG. 2B is a bottom plan view of the grouser assembly of FIG. 1.
Figure 3A:
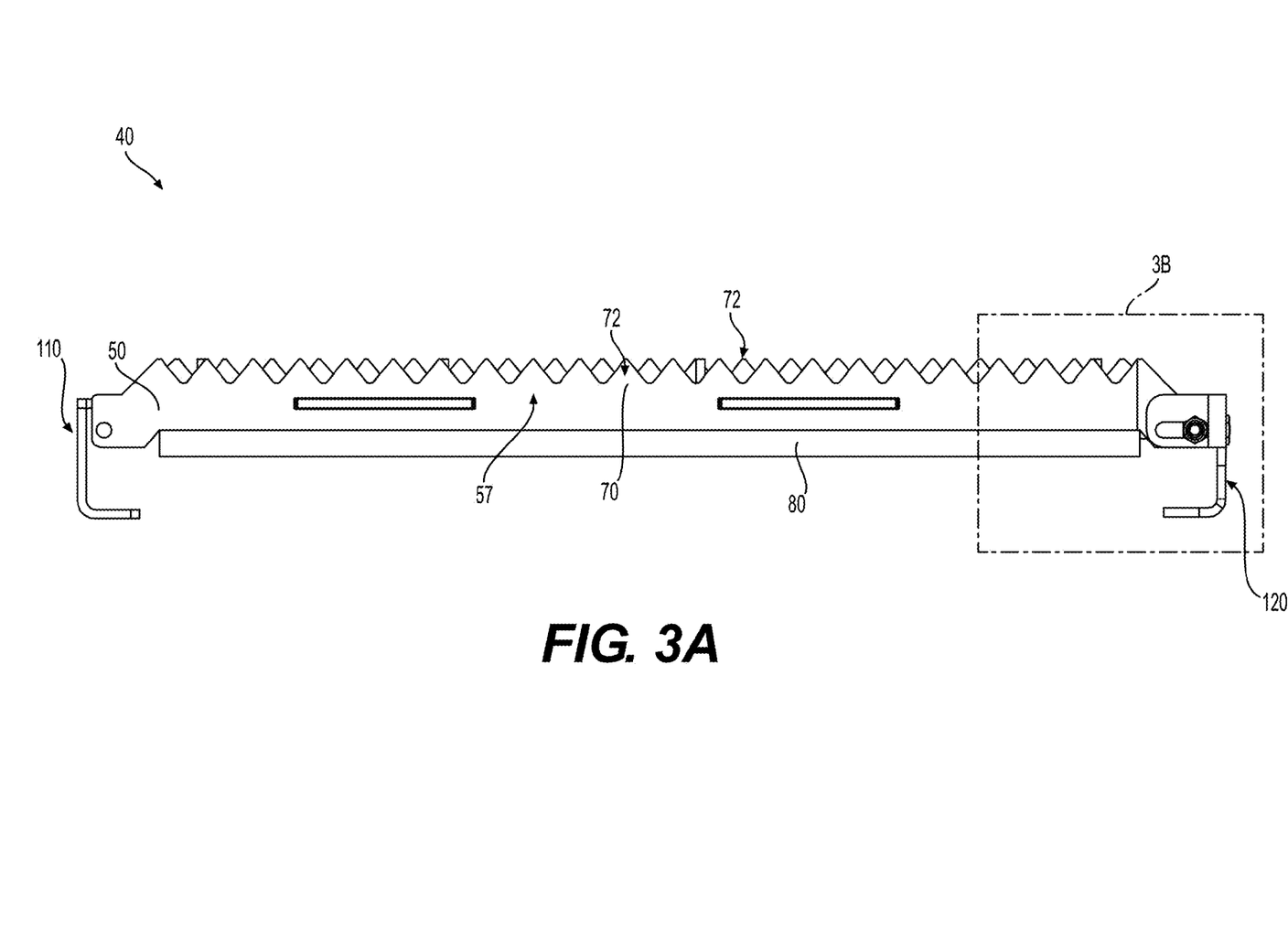
FIG. 3A is a rear elevation view of the grouser assembly of FIG. 1.
Figure 3B:
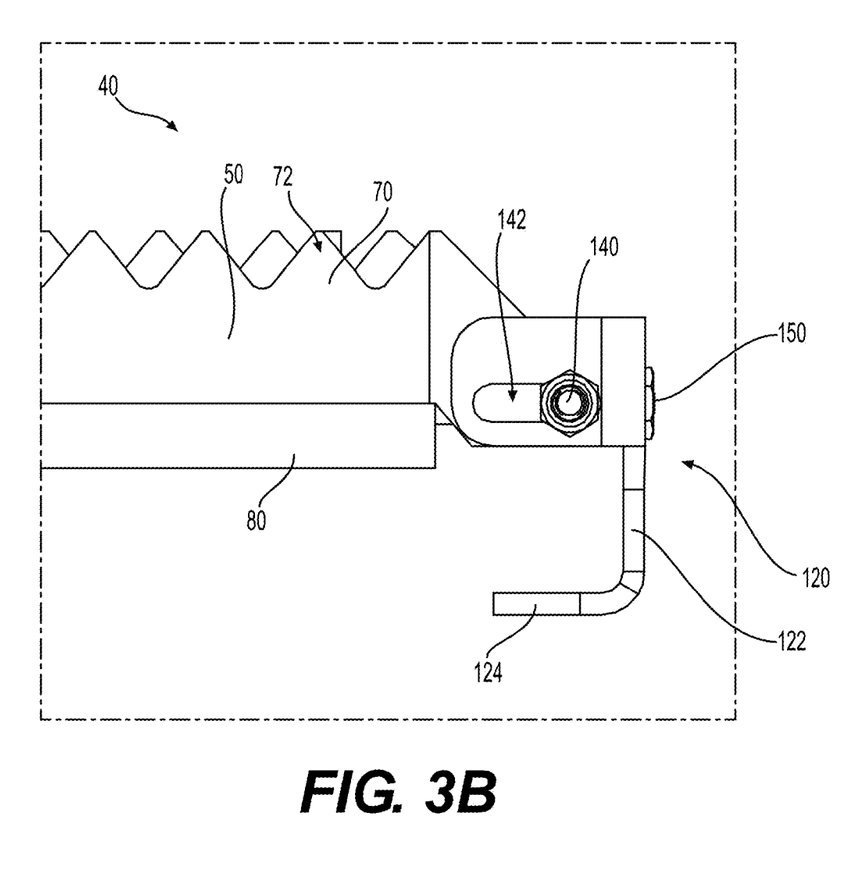
FIG. 3B is an enlarged view of section 3B of FIG. 3A.

The attachment assembly 120 is then configured into the released configuration, if not already done, as shown in FIG. 5. The hook 122 is then pivoted toward the side edge 220 of the carcass 202 and slidably moved toward the side edge 220. The fastener 140 is then fastened to clamp the attachment assembly 120 to the body 50. Referring to FIG. 6, the fastener 150 is then slidably engaged into the through hole 152 and threadedly engaged to the body 50 as shown in FIG. 2B. The fastener 150 then maintains the attachment assembly 120 into the attached configuration as a result of its clamping action.

The endless track system 180 can therefore be used with the grouser assembly 40 attached to the endless track 200.

In order to remove the grouser assembly 40 from the endless track, the user unfastens the fastener 150 and then disengages the fastener 150 from the body 50 and the attachment assembly 120. If needed, the fastener 140 can be loosened so as to facilitate the pivoting of the attachment assembly 120 away from the side edge 220. The user then lifts the grouser assembly 40 from outer surface 230 of the endless track 200 so as to move the body 50 away from the traction lugs 232. While doing so, the user may pivot the grouser assembly 40 about the attachment assembly 110 so as to disengage the hook 112 from the side edge 210 in order to completely remove the grouser assembly 40 from the endless track 200.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A grouser assembly selectively attachable to an elastomeric endless track having a carcass having first and second side edges and a ground-engaging outer surface including traction lugs, the grouser assembly comprising:
   a body having top and bottom faces, the body including a recess defined in the bottom face of the body, the recess being shaped to receive a traction lug of the traction lugs of the endless track in the recess;
   ground-contacting projections connected to the body, the projections extending away from the top face of the body such that when the grouser assembly is attached to the endless track the projections extend beyond the traction lugs;
   a first attachment assembly connected to the body for attaching the grouser assembly to the carcass of the endless track; and
   a second attachment assembly connected to the body for attaching the grouser assembly to the carcass of the endless track, the second attachment assembly having an attached configuration and a released configuration, and the second attachment assembly being positioned relative to the first attachment assembly such that when (i) the traction lug is received in the recess, (ii) the first attachment assembly attaches the grouser assembly to the carcass of the endless track, and (iii) the second attachment assembly is in the attached configuration, the second attachment assembly attaches the grouser assembly to the endless track;
   wherein, when the grouser assembly is attached to the endless track, a sidewall of the body is disposed within a valley of the endless track, the valley extending laterally across the ground-engaging outer surface of the endless track between a plurality of traction lugs of the traction lugs, and the grouse assembly further includes a shoe connected to a bottom edge of the sidewall of the body, and when the grouser assembly is attached to the elastomeric endless track, the shoe abuts a wall of at least one traction lug of the traction lugs.

2. The grouser assembly of claim 1, wherein, when the grouser assembly is attached to the endless track, the top and bottom faces of the body extend parallel to the outer surface of the endless track.

3. The grouser assembly of claim 1, wherein the recess is an aperture extending from the bottom face to the top face of the body.

4. The grouser assembly of claim 3, wherein, when the grouser assembly is attached to the endless track, an upper portion of the traction lug extends through the aperture.

5. The grouser assembly of claim 3, wherein, when the grouser assembly is attached to the endless track, an upper portion of the traction lug extends vertically beyond the top face of the body.

6. The grouser assembly of claim 1, wherein, when the grouser assembly is attached to the endless track:
   the recess is a plurality of recesses and the traction lug is a plurality of traction lugs; and
   each recess of the plurality of recesses receives one of the plurality of traction lugs.

7. The grouser assembly of claim 1, wherein, when the grouser assembly is attached to the endless track:
   the first attachment assembly includes a first hook facing and engaging with the first side edge of the carcass of the endless track; and
   the second attachment assembly includes a second hook facing and engaging with the second side edge of the carcass of the endless track when in the attached configuration.

8. The grouser assembly of claim 1, wherein the second attachment assembly is pivotably movable with respect to the body between the released configuration and the attached configuration.

9. The grouser assembly of claim 8, further comprising a fastener slidably engaging the second attachment assembly through a through hole defined in the second attachment assembly, and the fastener is threadedly engageable to the body.

10. The grouser assembly of claim 1, wherein the first and second attachment assemblies are free of fasteners extending within the carcass of the endless track.

11. The grouser assembly of claim 1, wherein the second attachment assembly is slidably movable with respect to the body.

12. The grouser assembly of claim 11, further comprising a fastener releasably clamping the second attachment assembly to the body as the fastener extends through slotted holes defined in at least one of the second attachment assembly and the body.

13. The grouser assembly of claim 1, wherein the first attachment assembly is movable with respect to the body, and the first attachment assembly has a released configuration and an attached configuration.

14. The grouser assembly of claim 1, wherein the body and the ground-contacting projections are integrally formed.

15. The grouser assembly of claim 1, wherein the ground-contacting projections include a plurality of teeth.

16. The grouser assembly of claim 1, wherein the body has front and rear sidewalls, and when the grouser assembly is attached to the elastomeric endless track further including drive lugs located on an inner surface opposite to the outer ground-engaging surface, the body is dimensioned such that the front sidewall is located in a front of a drive lug of the drive lugs, and the rear sidewall is located at a rear of the drive lug of the drive lugs.

17. The grouser assembly of claim 1, wherein, when the grouser assembly is attached to the endless track, the grouser assembly is retained to the endless track at least in part by the abutment of a wall of the recess with a wall of the traction lug that is received in the recess.

18. The grouser assembly of claim 1, wherein, when the grouser assembly is attached to the endless track, the grouser assembly is retained to the endless track at least in part by the abutment of a sidewall of the body with a wall of at least one traction lug of the traction lugs.

19. The grouser assembly of claim 1, wherein the recess is shaped to register with a wall of the traction lug that is received in the recess.

\* \* \* \* \*